(12) United States Patent
Barrett

(10) Patent No.: US 7,475,416 B2
(45) Date of Patent: Jan. 6, 2009

(54) SYSTEM AND METHODS FOR SEARCHING INTERACTIVE BROADCAST DATA

(75) Inventor: Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1231 days.

(21) Appl. No.: 09/880,985

(22) Filed: Jun. 13, 2001

(65) Prior Publication Data

US 2002/0194597 A1 Dec. 19, 2002

(51) Int. Cl.
- H04N 3/00 (2006.01)
- H04N 5/455 (2006.01)
- G06F 3/00 (2006.01)
- G06F 13/00 (2006.01)
- G06F 7/00 (2006.01)
- G06F 17/00 (2006.01)

(52) U.S. Cl. ............................................. 725/53; 707/3
(58) Field of Classification Search ................... 725/39, 725/52, 53, 60, 61, 136–139; 709/201; 711/216; 370/395.32; 345/327; 707/3–6, 10
See application file for complete search history.

(56) References Cited

U.S. PATENT DOCUMENTS 4,598,385 A * 7/1986 Kessels et al. ................. 707/3
6,216,264 B1 * 4/2001 Maze et al. .................... 725/53
6,347,314 B1 * 2/2002 Chidlovskii ..................... 707/3
6,480,835 B1 * 11/2002 Light ............................. 707/3
6,708,336 B1 * 3/2004 Bruette ......................... 725/57

FOREIGN PATENT DOCUMENTS

| GB | 2340633 A | 2/2000 |
| WO | WO 01/03002 A2 | 1/2001 |
| WO | WO 01/33838 A1 | 5/2001 |

* cited by examiner

Primary Examiner—Vivek Srivastava
Assistant Examiner—Fred Peng
(74) Attorney, Agent, or Firm—Workman Nydegger

(57) ABSTRACT

Methods, systems, and computer program products for searching interactive broadcast data for a string of text. Binary signatures are generated for each text description in the interactive broadcast data. A user-entered text string is also converted to a binary signature. A binary signature is a bit field representation of a block of text. A binary signature may be significantly smaller than the unconverted block of text, yet may still be unique when compared binary signatures of other blocks of text. All binary signatures may be generated using the same hash or digest function. The binary signature of the user-entered text string is compared to the binary signature of each entry in the interactive broadcast data. If the any of the comparisons indicate that the user-entered text string is included in an interactive broadcast data text description, other data associated with the interactive broadcast data may be retrieved.

27 Claims, 4 Drawing Sheets

SYSTEM AND METHODS FOR SEARCHING INTERACTIVE BROADCAST DATA

BACKGROUND OF THE INVENTION

1. The Field of the Invention

The present invention relates to the field of television. More specifically, the present invention relates to searching interactive broadcast data, such as an electronic program guide, that is being transmitted over a television network.

2. The Related Art

The number of viewers tuning into television programming continues to grow. This is in part due to the large number of programming options available. On many television networks, there are often hundreds of channels available. From among these channels, television viewers may find programming on a very large number of topics at any given time. Some channels also include interactive broadcast data such as news headlines or sports scores that are updated and displayed simultaneously with other programming.

Due to the large number of programming options, television networks may use an electronic program guide. An electronic program guide may include a listing of future programs, what channel the programs will be broadcast on, the time of broadcast, and a text description of the programs. Such guides are usually broadcast on a particular channel and updated as particular programs are complete or when new programs are scheduled for broadcast. Thus, electronic program guides may also be termed as interactive broadcast data.

Electronic program guides have greatly reduced the amount of time it takes for a user to find a particular program. However, electronic program guides often include hundreds or even thousands of programs for a particular time slot. As a result, finding a program can still be time consuming. To reduce the amount of time needed to find a program in an electronic program guide, conventional methods to search the program listings of a guide have been developed.

To search an electronic program guide, for example, some type of processing capability must be available. In many instances, this will be a set top box, which includes various hardware and software components that may be used to perform the search. A user would enter a string of text into the set top box using some type of input device, like a remote control or keyboard. The set top box would then search each program listing character by character to see if the entered text string was included in any of the program listings.

Searching an electronic program guide in this manner is highly inefficient because it requires a character comparison between each character in the entered string of text and each character included in the electronic program guide. With potentially thousands of electronic program guide listings and with each listing including potentially hundreds of characters of text, this may result in tens or hundreds of thousands of comparisons. Performing these types of searches on set top boxes, many of which have limited processor and memory resources, may consume a significant amount of time.

Therefore, what are desired are systems and methods for efficiently searching interactive broadcast data, such as an electronic program guide, where the systems and methods also conserve resources of associated processing systems.

SUMMARY OF THE INVENTION

The principles of the present invention provide for efficiently searching interactive broadcast data, such as an electronic program guide. A television and an attached set top box are included as part of a television network. The set top box receives binary signatures of the interactive broadcast data entries. When a user inputs a string of text, it is also converted into a binary signature. The binary signatures of the interactive broadcast data entries are then compared to the binary signature of the input text string.

A set top box receives binary signatures of interactive broadcast data, such as listings from an electronic program guide across a television network. The binary signatures may be generated using hashing or digest functions, which convert a block of text, such as an electronic program guide listing, into a reduced number of bytes. For instance, a program description including 100 characters of text, each character requiring one byte of data, may be reduced down to a binary signature, which may be a byte field of eight bytes. When a hash or digest function is executed, each word in the guide entry sets some number of bits in the signature byte field.

When the set top box receives a user-entered string of text, it converts the text into a binary signature as well. Text may be entered using a keyboard, remote control or the like. Converting the text may involve using the same hash or digest function that was used to convert the electronic program guide text entries.

The binary signature of the entered text is then compared to the binary signature for each entry in a set of interactive broadcast data. Depending on the functions used to convert the text to binary signatures, a wide variety of comparison techniques may be used. One such technique is to perform a logical OR operation on the binary signature of the entered text and the binary signature of each entry in the interactive broadcast data. The result is then compared to the binary signature from the interactive broadcast data entry that was used in the OR operation. If the result of the OR operation is identical to the binary signature from the interactive broadcast data entry, the comparison algorithm determines that there is a match between the entered text string and the interactive broadcast data entry. If a match is found, then the set top box may receive other text, such as the complete text of an electronic program guide listing, and display such text to the user.

Searching using binary signatures is advantageous over conventional methods. Reduced memory resources are used to store the interactive broadcast data that is searched. This is because binary signatures of the interactive broadcast data entries include less bytes of data than the full text of the data. Also, comparing binary signatures requires a reduced number of comparisons to determine if an entered text string is included in an interactive broadcast data entry. In some instances, the reduction in the number of comparisons is very substantial. This reduces the amount of processing resources needed to determine if an entered text string is included in an electronic program guide entry.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
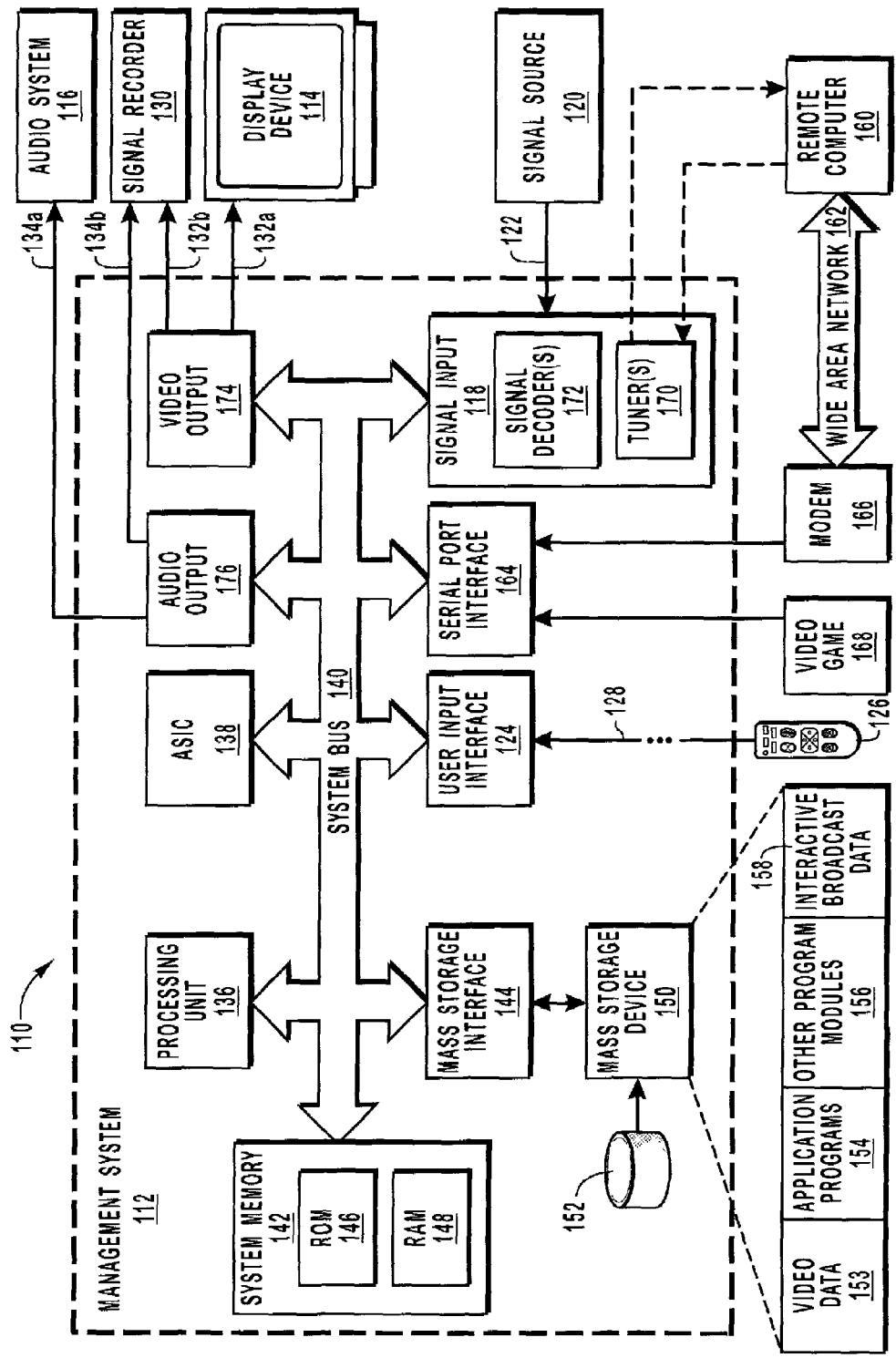
FIG. 1 illustrates an exemplary system that provides a suitable operating environment for the present invention.

The present invention extends to methods, systems, and computer program products for more efficiently searching interactive broadcast data for a string of text. Binary signatures are generated for interactive broadcast data text descriptions as well as a user-entered string of text. The binary signatures are then compared to determine if the user-entered text string is included in any of the interactive broadcast data text descriptions.

In operation, binary signatures of the text descriptions included in interactive broadcast data, such as electronic program guide entries, are received. The binary signatures are generated by a hash or digest function, which converts text into a binary signature. A user-entered text string is received and converted to a binary signature using a hash or digest function which produces the same results as the hash function used to convert the interactive broadcast data text descriptions. The binary signature of the user-entered text string is then compared to each binary signature of an interactive broadcast data text description. If the binary signature of the user-entered text string is included in one or more of the interactive broadcast data binary signatures, then the full text of the one or more interactive broadcast data text descriptions may be output to a user.

The embodiments of the present invention may comprise a special purpose or general-purpose processing device or computer including various computer hardware components, as discussed in greater detail below. The embodiments may further comprise multiple computers linked in a networked environment. Set top boxes that enhance the capabilities of conventional televisions represent an example of a special purpose computer.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

FIG. 1 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing steps disclosed herein, or may include any number of interconnected consumer electronic devices, one of which having a processing device for performing the data processing disclosed herein.

Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a compact disk read-only memory system ("CD-ROM"), a set-top box that serves as an Internet terminal, a cell phone, a personal digital assistant ("PDA") and any other device capable of processing data as described herein. Furthermore, the term "home entertainment system" is to be understood as a term that broadly describes a television-viewing environment, whether it is located in a viewer's home, at a place of business, in the public, or at any other location. Also for purposes of this description and in the claims, the term "programming" includes both the viewable and non-viewable portions of moving image data and its associated sound data.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying information. An Internet terminal may use standard telephone lines, Integrated Services Digital Network (ISDN) lines, cable lines associated with cable television service, or the like to connect to the Internet or other wide area networks.

FIG. 1 illustrates a home entertainment system 110 that includes a management system 112, a display device 114 and an audio system 116. Management system 112 may be a set-top box or Internet terminal that has been adapted to perform the operations disclosed herein. Management system 112 may be integrally positioned with or separate from display device 114, which may be a high definition television display, a standard television display, a flat panel display, a projection device, a high definition television display, a computer monitor, or any other device capable of displaying viewable video image data. Audio system 116 may be a speaker, a stereo system, or any device capable of emitting sound data, and similarly may be integrally positioned with or separate from display device 114.

Management system 112 includes a signal input 118, which receives programming from a signal source 120. The programming is transmitted from signal source 120 to signal input 118 via a programming input line 122, which can be a cable or optic connection, a terrestrial antenna system, a satellite system, or any device or system capable of transmitting programming to management system 112.

The signal source 120 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF or VHF), and the like.

While FIG. 1 illustrates home entertainment system 110 as having a single programming input line 122 and a single signal source 120, there may also be a plurality of programming input lines that transmit programming from a plurality of signal sources. In such embodiments, the home entertainment system may receive the programming from one signal source or from a plurality of signal sources at a time.

Management system 112 also includes a user input interface 124, which receives input from an input device 126, such as a remote control, external special purpose or general-purpose processing device or computer, keyboard, microphone, mouse, or any other device capable of generating electronic instructions for management system 112. Input device 126 is communicatively coupled to management system 112 over an input link 128 so as to enable such control. Input device 126 generates electronic instructions over input link 128 in response to preprogrammed data or in response to a viewer pressing buttons on input device 126. Input device 126 may also control Web browser software within management system 112 as when management system 112 is a set-top box or an Internet terminal that has been adapted to perform the operations disclosed herein. For instance, input device 126 may be programmed to turn on home entertainment system 110 and to tune management system 112 to a channel.

FIG. 1 illustrates a signal recorder 130, which is capable of receiving video and/or audio data and recording the data on a storage medium. Video signals are transmitted to display device 114 and/or signal recorder 130 by video image links 132a and 132b respectively, examples of which include a radio-frequency ("RF") link, an S-video link, a composite link, or any other equivalent form of video image link. Similarly, audio links 134a and 134b transmit audio data from management system 112 to audio system 116 and/or to signal recorder 130.

The operation of management system 112 is controlled by a central processing unit ("CPU"), illustrated as processing unit 136, which is coupled to an application-specific integrated circuit ("ASIC") 138 via system bus 140 and uses computer-executable instructions implemented in software and/or hardwired logic circuitry. Processing unit 136 and ASIC 138 are also coupled via a system bus 140 to various other system components, including system memory 142, mass storage interface 144, user interface 124 and signal input 118. Processing unit 136 may execute software designed to implement features of management system 112 including features of the present invention.

ASIC 138 includes circuitry that is used to implement certain functions of management system 112. Instructions, data, and other program modules necessary for the operation of processing unit 136 and necessary for the operation of the ASIC 138 may be stored in mass storage device 150 and/or system memory 142, which includes read-only memory ("ROM") 146 and random-access memory ("RAM") 148. System memory 142 is coupled to system bus 140 and mass storage device 150 is coupled to mass storage interface 144, which is in turn also coupled to system bus 140. Thus, ROM 146, RAM 148 and mass storage device 150 are communicatively coupled to ASIC 138 so as to be readable by ASIC 138 and so that data may be written from ASIC 138 to RAM 148 and to mass storage device 150. Mass storage device 150 may be a magnetic hard disk 152, but may also be any of the other computer-readable media referenced above.

Any desired computer-readable instructions or data, including application programs 154, other program modules 156, and interactive broadcast data 158. Interactive broadcast data 158 may include an electronic programming guide ("EPG"), which specifies the broadcast times and channels of programs can be stored in mass storage device 150.

Mass storage device 150 may also be used to record video data 153, in which case, management system 112 performs the functions of a digital video recorder. Digital video data may be received by home entertainment system 110 from a variety of sources including signal source 120, remote computer 160, video game 168, input device 126 and the Internet.

Interactive broadcast data, such as EPG data, sports scores or news headlines, may be obtained in a variety of manners. For instance, the interactive broadcast data may be supplied to management system 112 by a remote computer 160, such as a server, or from devices on the Internet and stored on mass storage device 150. The interactive broadcast data may be supplied on a regular basis to continually maintain a current schedule of programming at the management system 112. Alternatively, the interactive broadcast data may be delivered to home entertainment system 110 by using a direct-dial communication over standard telephone lines, or by using data transmission over the cable television infrastructure, a satellite network, an over-the-air broadcasting or any other available medium, including those previously mentioned.

In the embodiment where management system 112 is associated with the Internet, management system 112 may communicate with remote computer 160 via wide area network ("WAN") 162 using a variety of techniques, including interposing serial port interface 164 between the system bus 140 and modem 166, using a wireless link, or other means for establishing communications over a WAN that may be internal or external to management system 112. Management device 112 is also capable of transmitting information via the Internet by direct-dial communication over standard telephone lines, or by using any other available communication medium.

While serial port interface 164 may be utilized to connect modem 166 for communicating across a WAN, serial port interface may also be utilized to connect other consumer electronic devices, such as video game 168, and/or various input devices, such as a keyboard (not shown) or joystick (not shown), to management device 112.

Referring now to signal input 118, if the signal on programming input line 122 includes multiple channels, a tuner 170 included in signal input 118 tunes to a selected channel in the signal. Multiple tuners 170 can be used to provide enhanced viewing features, such as picture-in-picture, recording one channel while viewing another, and recording a plurality of channels simultaneously. A signal decoder 172 may convert video data from an analog format to a digital format, from a digital format to an analog format, or convent between varying digital formats, in the event that ASIC 138 and tuner 170 employ different formats. Signal decoder 172 may also decode video data from a compressed video format (e.g. MPEG). In embodiments where the management system 112 includes multiple tuners 170, management system 112 may also include multiple signal decoders 172 to perform the operations disclosed herein.

Management system 112 may also include video output 174, which may include a video encoder and/or a video converter. The video encoder assigns a code to frames of video data that are transmitted across video image links 132a and 132b and switches between analog and digital formats as necessary. Similarly, audio output 176 can include an audio converter to provide the necessary switching between analog and digital formats across audio links 134a and 134b.

Figure 2:
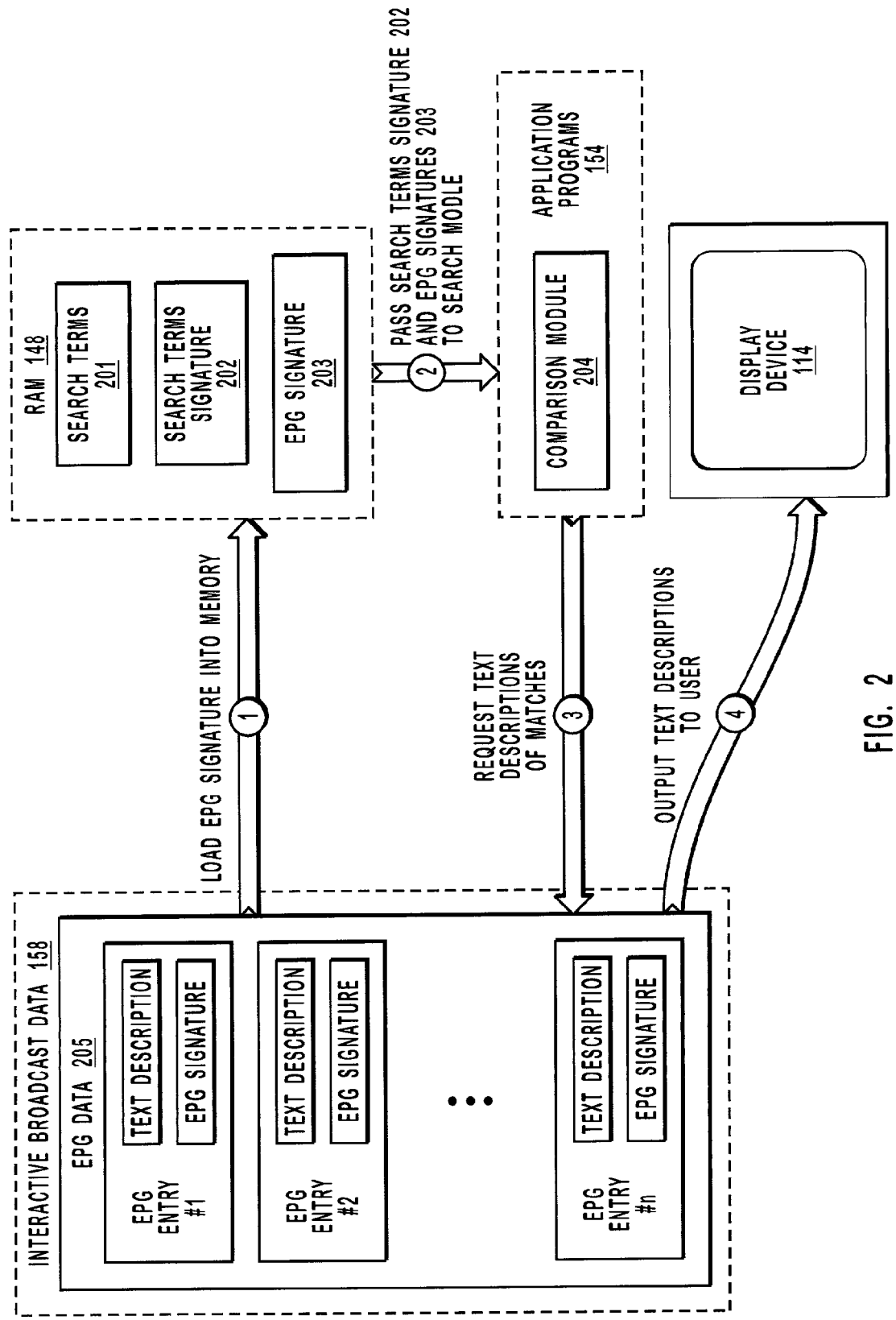
FIG. 2 is an example of a data structure illustrating electronic program guide data and how electronic program guide data is searched for a string of text.

While FIG. 1 and the corresponding discussion above provide a general description of a suitable environment in which the invention may be implemented, it will be appreciated that the features of the present invention disclosed herein may be practiced in association with a variety of different system configurations. This is true of the functional components included in FIG. 2 as well. The functional components included in FIG. 2 illustrate only one example of the practice of the invention. It should be understood that the invention, as embodied in FIG. 2, might also be practiced in a configuration that additionally includes one or more of the components as illustrated in FIG. 1.

As illustrated in FIG. 2, interactive broadcast data 158 (which includes EPG data 205), RAM 148, comparison module 204 and display device 114 are in communication. Such communication may occur over any system bus similar to system bus 140.

Figure 3:
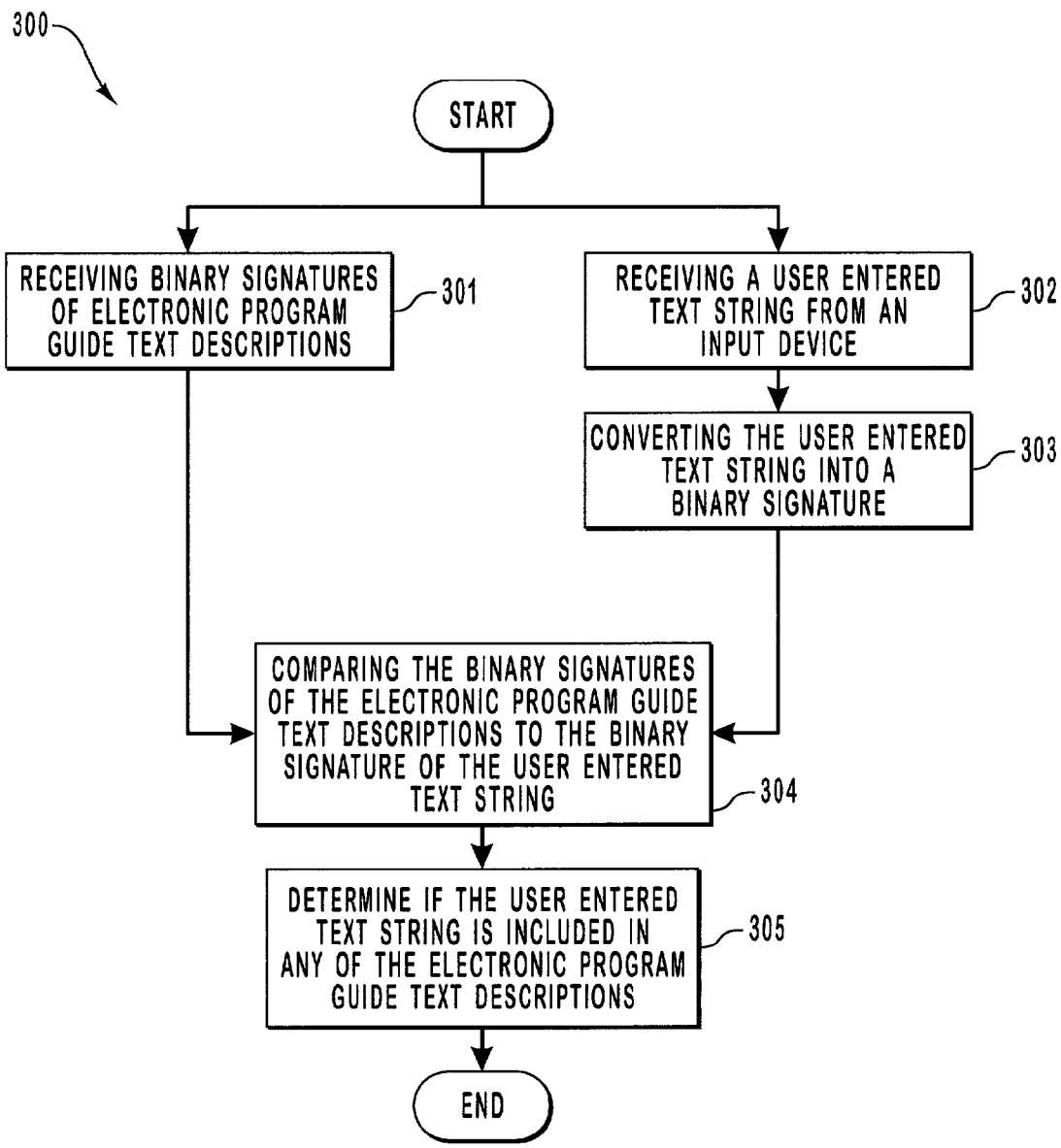
FIG. 3 is a flow diagram illustrating a method for efficiently searching electronic program guide data.

FIG. 3 illustrates a method 300 for efficiently searching interactive broadcast data to find a string of text. The method of FIG. 3 will be described in the context of the functional components and data structures illustrated in FIG. 2. Thus, elements of both FIGS. 2 and 3 will be referred to frequently in describing the operation of the present invention. The functionality of each of the components of FIG. 2 will become clear from the following description relating to both FIG. 2 and FIG. 3. The method discussed in relation to FIGS. 2 and 3 is just an example of how the present invention may be used to search text included in an EPG. However, it will be recognized by those of ordinary skill in the art that embodiments of the present invention may also be used to search other interactive broadcast data such as sports scores, news headlines, or other text that may be transmitted in conjunction with television programming.

In operation, binary signatures of EPG text descriptions are received (act 301). This is illustrated in FIG. 2 by arrow 1, whereby RAM 148 receives EPG signatures 203. After receipt, EPG signatures may be stored on any of the mass storage devices mentioned in reference to mass storage device 150.

A binary signature may be generated by setting one or more bits in a fixed length bit field. For example, in a bit field of 64-bits, each word included in a text description may set four bits. As more words are converted, different four bit combinations are set for each word. Converting text into a binary signature may be performed by hash functions. A hash function is an algorithm that turns messages or text into a fixed length of digits. The fixed length of digits, commonly referred to as a "hash value," is substantially smaller than the text itself. Additionally, the formula used to generate hash values does so in such a way that it is extremely unlikely that two different text strings will produce the same hash value. However, the practice of the invention is not limited to the use of hash functions. The invention may be practiced with digest functions or any other method where a string of text is converted into a binary representation.

As shown in FIG. 2, EPG data 205 includes EPG entries 1 through N, where N represents the last entry in EPG data 205. Included in each EPG entry is a text description and an EPG signature. The EPG signature of each EPG entry may be generated using hash, digest or other functions as mentioned above. EPG data 205 in FIG. 2 illustrates EPG signatures that were previously converted and stored in each EPG entry. For example, the data signatures may have been created before transmission to the home entertainment system 110. Alternatively, the home entertainment system 110 may convert the text descriptions into digital signatures sometime after they are received. However, it may also be that the EPG signatures are generated immediately before they are loaded into RAM 148. In such an instance, a program module, which may be included in application programs 154 or other program modules 156, converts the text descriptions to EPG signatures as they pass from EPG data 205 to RAM 148.

In a parallel operation, a user-entered text string is received (act 302). A user-entered text string may be received from an input device such as a keyboard or remote control 126, from another device included in wide area network 162, such as remote computer 160, or from a storage location such as system memory 142 or mass storage device 150. In FIG. 2, the user-entered text string is used to create search terms 201. Search terms 201 may be identical to the user-entered text string or some processing may be performed on the user-entered text string, which causes search terms 201 to differ from the user-entered text string. One example of such processing may be to remove commonly used words such as "the" in an effort to reduce the number of false positive results when searching.

After generating search terms 201, search terms 201 are convened into search terms signature 202, which is a binary signature (act 303). The hash, digest, or other function used to create search terms signature 202 may be the same function that was used to create the EPG signatures included in EPG signatures 203. However, since text descriptions of the EPO entries included in EPO data 205 may have substantially more text than search terms 201, different functions may be used. It may be the case that some functions are more efficient converting larger blocks of text while other functions are more efficient converting smaller blocks of text, yet both would produce the same binary signature when convening an identical block of text.

After both EPG signatures 203 and search terms signature 202 have been accessed, search terms signature 202 is compared to each binary signature in EPG signatures 203 (act 304). In FIG. 2, this is illustrated by arrow 2, where both EPG signatures 203 and search terms signature 202 are passed to comparison module 204. Comparison module 204 may be included in application programs 154 described above with reference to FIG. 1. Processing unit 136 would execute comparison module 204, which would in turn access the binary signatures stored in RAM 148.

There are a variety of ways well known in the art to compare binary signatures to determine if one text string is included in another text string, or in this case, if search terms 201 are included in an EPG entry. One method is to perform a series of logical OR operations. One of the two values used for each logical OR operation may be search terms signature 202. The other term for each logical OR operation may be the EPG signature for an EPG entry. For instance, a logical OR may be performed between search terms signature 202 and the EPG signature for EPG entry #1, then between search terms signature 202 and the EPG signature for EPG entry #2, and so forth.

Based on the results of the comparisons, it is determined if the user-entered text string is included in any of EPG text descriptions included in EPG data 205 (act 305). There are a wide variety of methods well known in the art for determining the results of a comparison of binary signatures. In the case of a comparison including a logical OR operation, one method is to compare the results of the logical OR operation to one of the terms used to perform the logical OR operation.

Figure 4A:
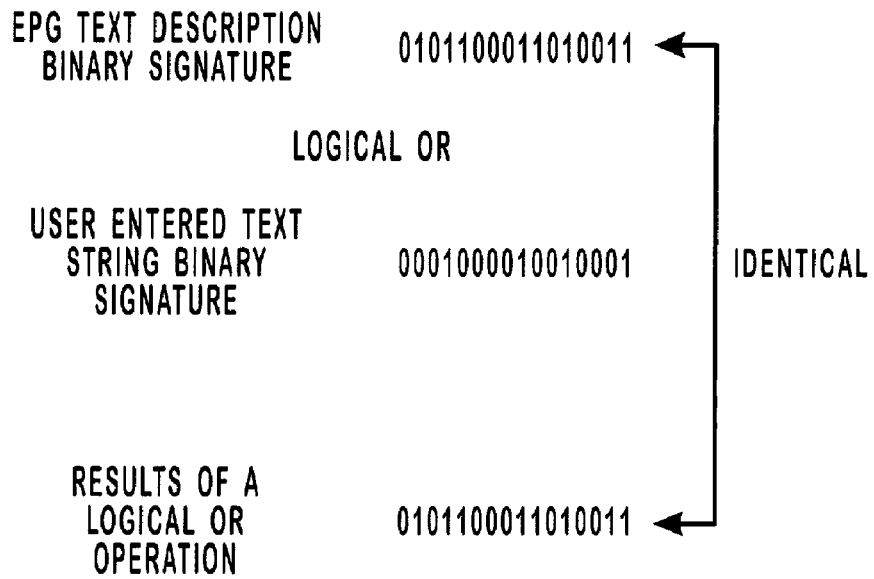
FIG. 4a is an example of a comparison of the binary signature of an electronic program guide entry and the binary signature of an entered string of text that results in a match.

FIG. 4a illustrates an example in which the user-entered text string is included in the given EPG text description. The binary signature for an EPG text description and for a user-entered text string are each represented by a bit field of 16 bits. Suppose both binary signatures were generated using an identical hash function, which for each word sets a combination of four of the bits in the bit field. Some words may have one or more bits in common. As illustrated in FIG. 4a, the bit field resulting from the logical OR operation is identical to the binary signature for the EPG text description.

Figure 4B:
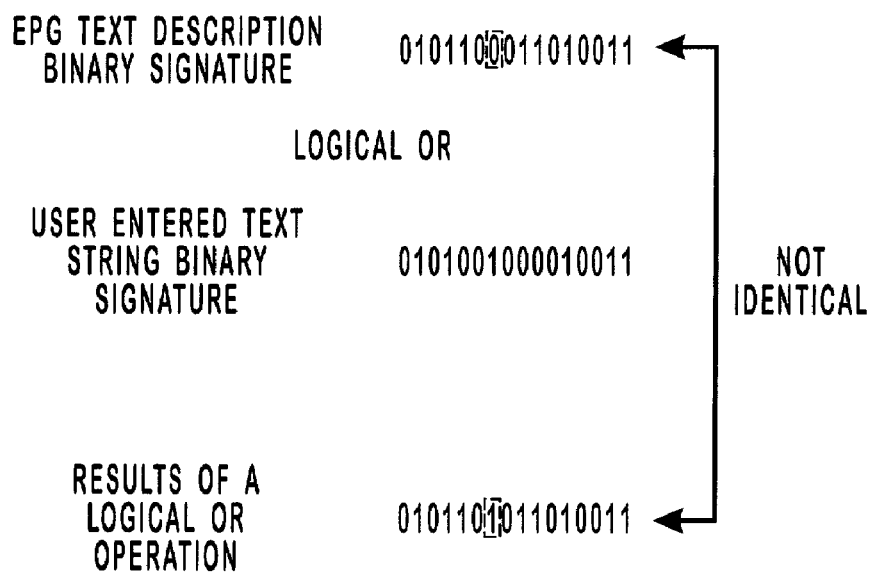
FIG. 4b is an example of a comparison of the binary signature of an electronic program guide entry and the binary signature of an entered text string that does not result in a match.

FIG. 4b illustrates an example in which the user-entered text string is not included in the given EPG text description. The binary signature for an EPG text description and for a user-entered text string are again each represented by a bit field of 16 bits. Suppose again that both binary signatures were generated using an identical hash function, which for each word sets a combination of four of the bits in the bit field. Some words may have one or more bits in common. As illustrated in FIG. 4b, the bit field resulting from the logical OR operation is not identical to the binary signature for the EPG text description, as emphasized by the bit enclosed in the dashed box in FIG. 4b.

Returning to FIG. 2, comparison module 204 determines whether search terms signature 202 is included in any of the EPG signatures included in EPG signatures 203. If search terms signature 202 is included in one or more of the EPG signatures, comparison module 204 requests the full text descriptions of the EPG entries associated with the one or more EPG signatures This is illustrated by arrow 3 in FIG. 2.

FIG. 2 illustrates comparison module 204 as determining whether search terms signature 202 is included in any of the EPG signatures. However, one or more other program modules included as part of applications programs 154 or other program modules 156 may be executed to make the determination. It may also be the case that comparison module 204 or other program modules are already loaded into system memory 142 when processing unit 136 executes the program modules.

Comparison module 204, or the other program modules involved, may request text descriptions as each match is found, or such modules may store the EPG signatures and request all the text descriptions simultaneously. EPG signatures may be stored on a mass storage device, such as mass storage device 150, or in a memory, such as system memory 142. The requested text descriptions are then output to a user as illustrated by arrow 4 in FIG. 2. Text descriptions may be displayed on a display device such as display device 114.

By using binary signatures, the present invention conserves memory resources. Storing a binary signature may use significantly less system memory then storing a complete text description. This reduces the overall amount of data that must be loaded into system memory before a search is performed. Using binary signatures also conserves processor resources. Since a binary signature may include a fewer number of bytes than a complete text description, less comparisons are needed to determine if a user-entered text string is included in an EPG entry. By reducing the number of comparison, fewer processor resources are used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a system including a television and a video transmission medium, wherein interactive broadcast data text descriptions such as electronic program guide information, news headlines, sports scores, or other similar kinds of periodically updated information that can be displayed as text simultaneously with other programming is transmitted across the video transmission medium, and wherein the system also includes a management system having a digital processor for processing one or more unique digital signatures that correspond to the interactive broadcast data, and an input device for inputting other digital data that corresponds to user instructions input by a user when searching for particular interactive broadcast data, a method for efficiently searching the interactive broadcast data in response to a string of text input by a user in order to identify the particular interactive broadcast data desired by the user, the method comprising:

receiving interactive broadcast data at the management system, said interactive broadcast data having unique binary signatures, each unique binary signature generated for an electronic program guide entry using programming information from a plurality of information fields of the electronic program guide entry, wherein each of the unique binary signatures is created prior to transmission across the video transmission medium using a first function adapted to convert alphanumeric text in fields of the electronic program guide entries into unique binary signatures having a fixed number of bytes, wherein at least one of the unique binary signatures includes a plurality of distinct four bit binary representations corresponding to a plurality of distinct terms found within a single electronic program guide entry, with each of the distinct four bit binary representations in the unique binary signature corresponding to a distinct term, and with all of the distinct four bit binary representations being concatenated into a single binary signature comprising the fixed number of bytes, storing the unique binary signatures at the management system;

receiving a first user-entered text string;

using a second function to convert the first user-entered text string into a unique binary signature;

retrieving and comparing the stored unique binary signatures corresponding to the interactive broadcast data text descriptions to the unique binary signature of the user-entered text string; and based on the comparison, the management system identifying at least one item of interactive broadcast data that matches the user-entered text string.

2. The method as recited in claim 1, wherein receiving binary signatures of the interactive broadcast data text descriptions comprises the following:
- receiving binary signatures of the interactive broadcast data text descriptions, the binary signatures being converted from interactive broadcast data text descriptions using a first set of specified rules, which cause the interactive broadcast data text descriptions to differ from an original version prior to conversion into the binary signatures and by deleting at least one commonly used word.

3. The method as recited in claim 2, wherein converting the user-entered text string into a binary signature comprises the following:
- converting the user-entered text string into a binary signature using a second set of specified rules, which causes the user-entered text string to differ from an original version prior to conversion into the binary signatures.

4. The method as recited in claim 3, wherein the first set of specified rules and the second set of specified rules are the same.

5. The method as recited in claim 1, wherein comparing the binary signatures of the interactive broadcast data text descriptions to the binary signature of the user-entered text string comprises the following:
- comparing the binary signatures of electronic program guide text descriptions to the binary signature of the user-entered text string.

6. The method as recited in claim 1, wherein receiving binary signatures of the interactive broadcast data text descriptions comprises the following:
- a set top box associated with a television receiving binary signatures of the interactive broadcast data text descriptions.

7. The method as recited in claim 1, wherein receiving a user-entered text string from an input device comprises the following:
- a set top box associated with a television receiving a user-entered text string from an input device.

8. The method as recited in claim 1, wherein storing the binary signatures of the interactive broadcast data text descriptions comprises the following:
- storing the binary signatures of the interactive broadcast data text descriptions on one or more physical storage media.

9. The method as recited in claim 1, wherein comparing the binary signatures of the interactive broadcast data text descriptions to the binary signature of the user-entered text string comprises the following:
- comparing each binary signature of an interactive broadcast data text description to the results of a logical OR operation performed on each binary signature of an interactive broadcast data text description and the binary signature of the user-entered text string.

10. The method as recited in claim 1, further comprising:
- receiving additional text, which is associated with one or more interactive broadcast data text descriptions.

11. The method as recited in claim 10, wherein receiving additional text, which is associated with one or more interactive broadcast data text descriptions comprises the following:
- receiving additional text, which is associated with one or more electronic program guide text descriptions.

12. The method as recited in claim 10, wherein receiving additional text, which is associated with one or more interactive broadcast data text descriptions comprises the following:
- receiving additional text, which is associated with one or more interactive broadcast data text descriptions, if the user-entered text string is included in any of the interactive broadcast data text descriptions.

13. The method as recited in claim 12, wherein receiving additional text, which is associated with one or more interactive broadcast data text descriptions, if the user-entered text string is included in any of the interactive broadcast data text descriptions comprises the following:
- receiving additional text, which is associated with one or more interactive broadcast data text descriptions, if the results of a logical OR operation performed on any of the binary signatures of the one or more interactive broadcast data text descriptions and the binary signature of the user-entered text string is identical to any of the binary signatures of the one or more interactive broadcast data text descriptions.

14. The method as recited in claim 1, wherein determining based on the comparison, if the user-entered text string is included in any of the interactive broadcast data text descriptions comprises the following:
- determining based on the comparison, if the user-entered text string is included in any electronic program guide text descriptions.

15. The method of claim 1, wherein the unique binary signatures for the interactive broadcast data are converted immediately before they are loaded into RAM at the management system such that the interactive broadcast data text descriptions are converted to unique electronic program guide signatures as they pass from electronic program guide data to RAM.

16. The method of claim 1, wherein the fixed size of each of the unique binary signatures is 16 bits.

17. The method of claim 1, wherein the unique binary signatures for the interactive broadcast data are created prior to transmission to the management system.

18. The method of claim 1, wherein the unique binary signatures for the interactive broadcast data are created by the management system.

19. The method claim 1, wherein the first function is either a hash or digest function that produces unique hash or digest values for the unique binary signatures for the interactive broadcast data text descriptions.

20. The method of claim 19, wherein the second function is either a hash or digest function that produces a unique hash or digest value for the unique binary signature for the user entered-text string.

21. The method of claim 1, wherein the management system identifies only one item of interactive broadcast data that matches the user entered-text string, and wherein full text descriptions corresponding to the interactive broadcast data are displayed at the management system.

22. The method of claim 21, wherein a plurality of user entered-text strings are input into the management system, and wherein the management system identifies a plurality of items of interactive broadcast data that match the user entered-text string, and wherein all of the full text descriptions corresponding to each of the matching interactive broadcast data are simultaneously displayed at the management system.

23. A method as recited in claim 1, wherein the fixed size of each of the unique binary signatures is 64 bits.

24. A method as recited in claim 1, wherein the fixed size of each of the unique binary signatures is 8 bytes.

25. A recordable-type computer-readable storage medium storing computer-readable instructions that, when executed, implement the method recited in claim 1.

26. As recited in claim 25, wherein the computer executable instructions that when executed at a set top box cause the set top box to receive binary signatures of electronic program guide text descriptions.

27. As recited in claim 25, wherein the recordable-type computer-readable medium is system memory.

* * * * *